Aug. 27, 1957  J. F. SHIRK  2,804,361
PISTON RING ASSEMBLY
Filed May 18, 1953

INVENTOR.
John F. Shirk,
BY
Davis Lindsey Hibben & Noyes
Attys.

United States Patent Office 2,804,361
Patented Aug. 27, 1957

2,804,361

PISTON RING ASSEMBLY

John F. Shirk, Hagerstown, Ind., assignor to Perfect Circle Corporation, Hagerstown, Ind., a corporation of Indiana Application May 18, 1953, Serial No. 355,470

5 Claims. (Cl. 309—45)

The invention relates generally to piston rings and more particularly to a piston ring assembly for an internal combustion engine.

The general object of the invention is to provide a novel piston ring assembly comprising a plurality of parts which are held together so that they may be placed on the piston as a unit rather than placing each part of the assembly separately on the piston.

Another object is to provide a novel piston ring assembly comprising a ring member and an expander which embraces the ring member in such a manner that the expansive force of the expander tends to hold it in assembled relation with the ring member.

A further object is to provide a novel piston ring assembly including an expander which is so formed that it is held in assembled relation with the other portion of the ring assembly both while it is being placed on the piston and after it is positioned within the groove in the piston.

Other objects and advantages will become apparent from the following description taken in connection with the accompanying drawing, in which.

Figure 1:
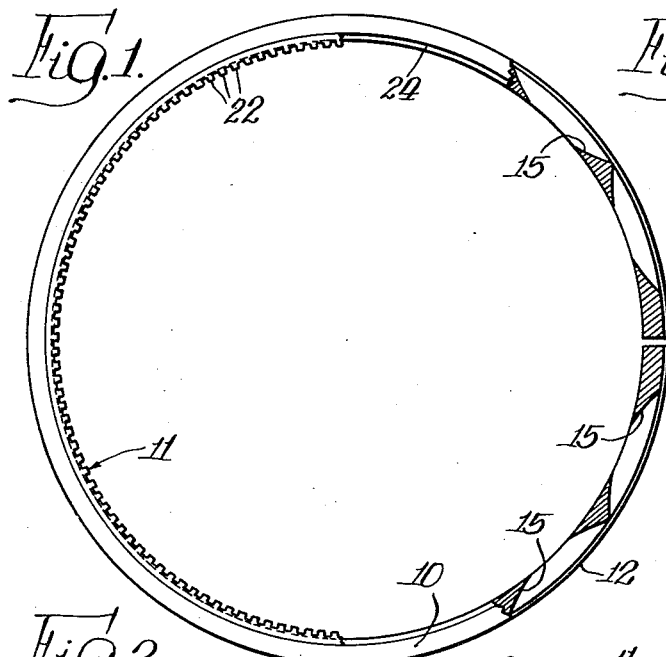
Fig. 1 is a plan view of a ring assembly embodying the features of the invention, with portions of the assembly broken away.
Figure 4:
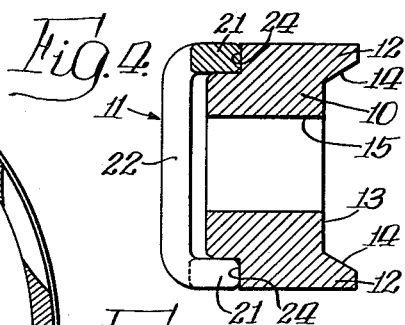
Fig. 4 is a radial cross sectional view of the ring assembly shown in Fig. 1.

A piston ring assembly embodying the features of the invention is particularly adapted for use as an oil ring on pistons employed in internal combustion engines. The ring comprises generally ring means having two or more circumferentially extending edges for engaging the cylinder wall, and an expander for increasing the expansive pressure exerted by the ring means against the cylinder wall. The ring means may comprise a single ring member having a pair of cylinder-engaging flanges formed at the respective sides thereof or the ring means may comprise a member of this character together with a pair of cylinder engaging rails positioned at opposite sides of the ring member. In any of these forms of ring means, the expander may engage the ring member to cause it to bear against the cylinder wall with greater pressure, or it may engage the rails to increase the pressure with which they bear against the cylinder wall.

It is desirable, both from the standpoint of making sure that the parts of the ring assembly are properly positioned relative to each other and from the standpoint of ease of assembly, to have the parts cooperate with each other in such a manner that they may be assembled before being placed on the piston and will be retained in assembled relation to each other during the installation on the piston. Thus, the ring can be easily installed with assurance that the parts thereof will properly cooperate with each other.

There are some pistons in use at present where the groove for receiving the oil ring is cut away at its lower side for major portions of the circumference of the piston. Where an ordinary hump spring is used as an expander, such spring may drop down in the open lower side of the groove so that it does not bear outwardly against the cylinder-engaging ring means and cooperate therewith in a proper manner. This difficulty is avoided in a ring embodying the features of the invention, by having the expander so formed that it is held in proper position by the ring means and cannot drop down in the piston ring groove even when the latter is cut away as above described. Thus, the structure which holds the parts of the ring together during installation of the ring in the groove also functions, as to the expander, to maintain the proper assembled relationship after installation.

The preferred embodiment of the invention is shown in Figs. 1 to 4. The ring means in this case comprises a single ring member 10 and an expander indicated generally at 11. The ring member 10 may be made of cast iron or steel and is of sufficient axial height to fit within the groove provided therefor in the piston, sufficient clearance being provided between the sides of the ring member 10 and the sides of the groove to permit the ring member to expand and contract freely. The ring member 10 is provided with a pair of cylinder-engaging flanges 12 at the respective sides of the ring member. The flanges 12 are preferably formed by cutting a circumferentially extending groove 13 in the outer periphery of the ring member 10, the groove having beveled sides 14. Extending through the ring member 10 to provide for flow of oil scraped from the cylinder wall are a plurality of slots 15 formed by cutting inwardly from the outer periphery of the ring.

Figure 2:
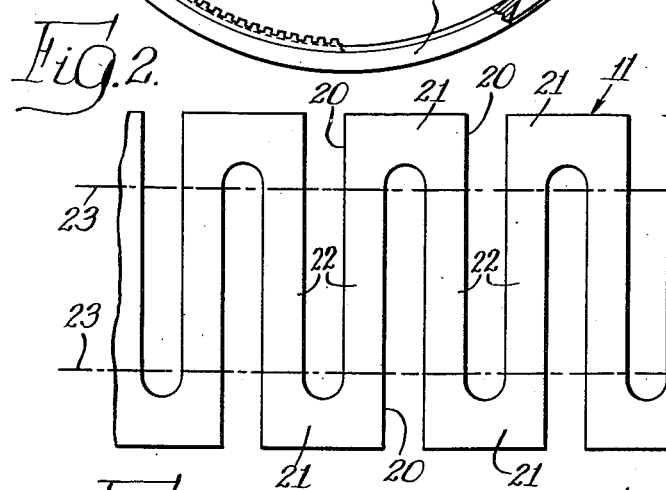
Fig. 2 is an enlarged fragmentary view of a blank for an expander constituting a portion of the assembly shown in Fig. 1.
Figure 3:
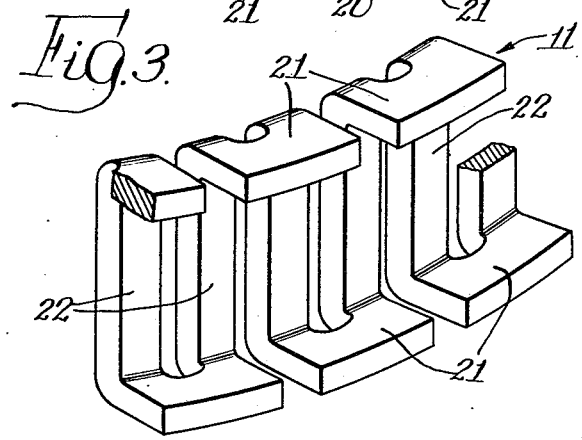
Fig. 3 is an enlarged fragmentary perspective view of an expander made from the blank shown in Fig. 2.

Cooperating with the ring member 10 is the expander 11 which, in the present instance, is of the form which does not require abutment against the bottom of the ring groove to exert its expanding force. Thus, the expander 11 is of the self-expanding type, that is, a spring device which is circumferentially expansible. To this end, the expander 11 is made from a strip of sheet metal as shown in Fig. 2 and is provided with transversely extending slots 20 opening inwardly and alternately from the opposite edges of the strip. The slots 20 thus provide segments 21 along opposite edges of the strip with each segment at one side of the strip connected to two of the segments on the opposite side of the strip by means of web members 22. The strip is then folded along longitudinally extending lines as indicated at 23, and is formed into a ring which is U-shaped in radial cross section opening outwardly, as illustrated in Fig. 3. When this type of structure is compressed within a ring groove, it tends to expand circumferentially and does not require the backing of the bottom of the groove to effect such expansion.

The expander 11 is adapted to cooperate with the ring member 10 to cause the latter to engage the cylinder walls with a greater pressure than the ring member 10 alone is capable of doing. Thus, the expander is placed within the groove in the piston inside of the ring member 10 and so arranged as to bear outwardly thereon.

The principal feature of the invention is to provide a structure in which the parts tend to remain in assembled relation to each other. To this end, the U-shape of the expander is utilized and is adapted to embrace the inner portion of the ring member so that the expansive force exerted by the expander 11 tends to hold it on the ring member 10. To accommodate the expander, the ring member 10 is cut away at its inner periphery on both sides of the ring to provide grooves 24 in which the arms of the U of the expander may extend, such arms constituting the segments 21 of the expander. The radial depth of the grooves 24 is such that the web members 22 of the expander are held in inwardly spaced relation to the inner periphery of the ring member. Thus, the expander exerts an outward force against the inwardly facing shoulders formed by the grooves 24 and increases the pressure exerted by the ring member against the cylinder wall. The axial depth of the grooves 24 is substantially the same as the thickness of the metal from which the expander is formed so that the segments 21 constitute the inner portion of the side faces of the ring assembly while the side faces of the ring member 10 constitute the outer portion thereof. The slots 20 formed by the web members 22 provide openings cooperating with the slots 15 in the ring member 10 to permit the free inward flow of oil scraped from the cylinder wall by the flanges 12.

With this construction, the expander exerts an outward force on the ring member 10 and may be preassembled therewith by placing it in embracing relation with the ring member 10, the segments 21 of the expander fitting within the grooves 24. Such embracing relation between the two parts of the ring obviously will retain them in assembled relation while being installed as well as after installation, since the expansive force of the expander is constantly urging it outwardly and thus holds it on the ring member 10.

Figure 5:
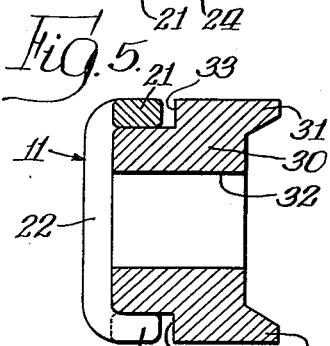
Fig. 5 is a view similar to Fig. 4 but showing a modified form of ring assembly.

The modified form of ring shown in Fig. 5 is similar to that heretofore described but differs in the manner in which the expander 11 engages the ring means. The ring means in this instance, as in the first-described form, comprises a single member 30 having a pair of cylinder engaging flanges 31. It is also provided with radially extending slots 32 to provide for flow of oil scraped off the cylinder wall by the flanges 31. The ring member 30 is also grooved at its inner periphery on its two sides, as indicated at 33, to receive the expander. The expander in this instance is of the same form as shown in the earlier numbered figures. The grooves 33 in this form are of greater radial depth than the groove 24 in the earlier form and are so dimensioned that the edge portions of the segments 21 of the expander cannot engage the inwardly facing shoulders formed by the grooves 33. However, the web portions 22 of the expander engage the inner periphery of the ring member 30 so that the expander exerts an outward force on the ring member. The spaces between the web member 22, provided by the slots 20 in the expander, permit free flow of oil inwardly through the slots 32. The expander 11, in this instance, just as in the case of the earlier form of ring, embraces the ring member so that the two are held in assembled relation both while being installed and after installation.

Figure 6:
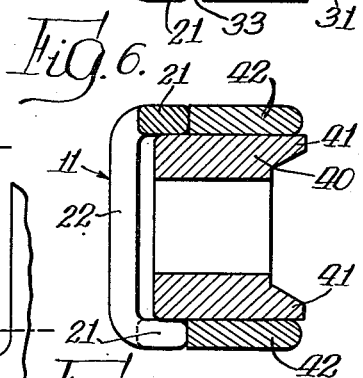
Fig. 6 is a view similar to Figs. 4 and 5 but showing another modified form of ring assembly.
Figure 7:
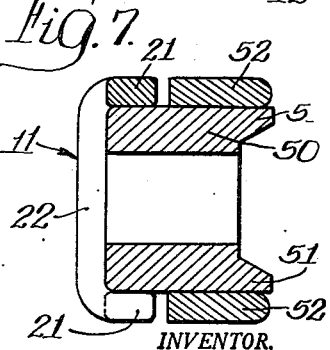
Fig. 7 is a view similar to Figs. 4, 5 and 6 but showing still another modified form of ring assembly.

In the two forms shown in Figs. 6 and 7, the ring means comprises a ring member and a pair of cylinder engaging rails, and the expander may cooperate with the rails, in the form shown in Fig. 6, or may cooperate with the ring member in the case shown in Fig. 7 to increase the expansive force thereof. In both of these forms, the expander embraces the ring member to hold the two in assembled relation.

In the form shown in Fig. 6, the ring means comprises a ring member 40 having a pair of cylinder engaging flanges 41 at its respective sides. The ring member 40 is narrower in an axial direction than the groove in which it is positioned in order to provide space at either side thereof for a pair of rails 42. The rails 42 are dimensioned to engage the cylinder walls adjacent the flanges 41. The ring member 40 extends inwardly beyond the inner periphery of the rails 42, and the expander 11 is dimensioned to embrace the inwardly extending portion of the ring member 40. The same form of expander, heretofore described, is used and the radial width of the rails 42 is such that the outer edges of the segments 21 of the expander abut against the inner periphery of the rails 42 to increase the expansive force thereof against the cylinder wall. The radial dimension of the rails 42 is also such that the web members 22 of the expander are inwardly spaced from the inner periphery of the ring member 40 so that no outward force is exerted on the ring member by the expander. Nevertheless the expander embraces the ring member so that the two are held in assembled relation.

To hold the rails 42 in assembled relation while the ring assembly is being installed, an adhesive is employed between the rails and the sides of the ring member 40. Such adhesive may be of rubber latex material which is soluble in oil at engine operating temperature. Thus, the rails 42 are held in assembled relation with the other parts of the ring assembly during installation but as soon as the engine becomes heated through operation, the adhesive between the rails and ring member is dissolved and the rails 42 are then free to expand outwardly under their own expansive force and the force exerted by the expander 11, independently of the ring member 40, the inherent expansibility of the latter holding the flanges 41 in contact with the cylinder wall.

The form of ring shown in Fig. 7 is generally similar to that shown in Fig. 6 in that it comprises a ring member 50 having cylinder engaging flanges 51 and a pair of rails 52 located at the sides of the ring member 50 adjacent the flanges 51. The same expander 11 may be used in this instance as in the other forms, but the radial width of the rails 52 in this form is such that the inner peripheries thereof are held out of contact with the expander 11 with the rails engaging the cylinder wall. The expander 11 embraces the inner portion of the ring member 50 and its expansive force is exerted against the ring member 50 by having the web members 22 contacting the inner periphery of the ring member. The embracing relation of the expander 11 to the ring member 50 of course holds these two parts in assembled relation. The rails 52 are held in assembled relation with the ring member 50 during installation by using an adhesive similar to that employed in the case of the form shown in Fig. 6.

It will be evident from the foregoing that I have provided a novel piston ring assembly comprising a plurality of parts which are held together so that they may be readily installed. Moreover, the expander by its embracing relation with the ring member is held in proper relation therewith after installation. Thus, when it is used in a piston where the lower side of the groove is cut away, the expander cannot slip down.

I claim:

1. A piston ring assembly comprising flat annular split expandable cylinder wall engaging members formed of ductile ribbon metal coiled edgewise, a spacer member disposed between said ring elements in axial supporting relation thereto while permitting independent radial movement thereof between the spacer member and the adjacent side wall of the groove in which the assembly is installed, and a split annular circumferentially and radially springable expander member of outwardly facing channel section formed of a strip of ductile metal of uniform width and thickness and having transverse slots closed at one end and opening alternately through one flange and extending across the web and into the other flange providing an annular series of connected circumferentially spaced and circumferentially springable elements when the assembly is installed in a piston ring groove at the inner side of the cylinder wall engaging members and spacer member with the ends of the expander member in abutting relation and with the edges of the flanges in radial thrust engagement with the cylinder wall engaging members and acting to impart springable radial thrust thereto while permitting independent radial movement thereof, the expander member being in axially supported relation to the side walls of the groove.

2. A piston assembly comprising annular split expandable cylinder wall engaging members, a spacer member disposed between said ring elements in axial supporting relation thereto while permitting independent radial movement thereof between the spacer member and the adjacent side wall of the groove in which the assembly is installed, and a split annular circumferentially and radially springable expander member of outwardly facing channel section formed of ductile metal and having transverse slots closed at one end and opening alternately through one flange and extending across the web and into the other flange providing an annular series of connected circumferentially spaced and circumferentially springable elements when the assembly is installed in a piston ring groove at the inner side of the cylinder wall engaging members and spacer member with the ends of the expander member in abutting relation and with the edges of the flanges in radial thrust engagement with the cylinder wall engaging members and acting to impart springable radial thrust thereto while permitting independent radial movement thereof.

3. A piston ring assembly comprising annular split expandable cylinder wall engaging members, a spacer member disposed between said ring elements in axial supporting relation thereto, and a split annular circumferentially and radially springable expander member of outwardly facing channel section and having transverse slots closed at one end and opening alternately through one flange and extending into the other flange providing an annular series of connected circumferentially spaced and circumferentially springable elements when the assembly is installed in a piston ring groove with the ends of the expander member is abutting relation and with the edges of the flanges in radial thrust engagement with the cylinder wall engaging members.

4. A piston ring assembly comprising annular split expandable cylinder wall engaging members, a spacer member disposed between said ring elements in axial supporting relation thereto while permitting independent radial movement relative to each other when installed in a ring groove, and a split annular circumferentially and radially springable expander member of outwardly facing channel section having transverse slots therein opening alternately through one flange and extending into the other flange providing an annular series of connected circumferentially spaced and circumferentially springable elements when the assembly is installed in a piston ring groove at the inner side of the cylinder wall engaging members with the ends of the expander member in abutting relation and with the edges of their flanges in radial thrust engagement with the cylinder wall engaging members and acting to impart springable radial thrust thereto while permitting independent radial movement thereof.

5. A piston ring assembly comprising annular split axially spaced cylinder wall engaging members, a spacer disposed between said members in axial supporting relation thereto while permitting independent radial movement thereof between the spacer and the side walls of the groove in which the assembly is installed, split annular circumferentially and radially springable expander member of outwardly facing channel section formed of a strip of ductile metal of uniform width and thickness and having transverse slots closed at one end and opening alternately through one flange and extending across the web and into the other flange providing an annular series of connected circumferentially spaced and circumferentially springable elements when installed in a piston ring groove at the inner side of axially spaced cylinder wall engaging members with the ends of the expander member in abutting relation and with their edges in radial thrust engagement with the cylinder wall engaging members and acting to impart springable radial thrust thereto while permitting independent radial movement thereof.

References Cited in the file of this patent

UNITED STATES PATENTS

| | | |
|---|---|---|
| 2,182,851 | Muchnic | Dec. 12, 1939 |
| 2,243,064 | Ballard | May 27, 1941 |
| 2,330,550 | Bowers | Sept. 28, 1943 |
| 2,362,286 | Mason | Nov. 7, 1944 |
| 2,606,800 | Teetor | Aug. 12, 1952 |
| 2,635,022 | Shirk | Apr. 14, 1953 |
| 2,635,933 | Engelhardt | Apr. 21, 1953 |
| 2,693,398 | Anderson | Nov. 2, 1954 |
| 2,729,524 | Prasse | Jan. 3, 1956 |